United States Patent
Cummings

(10) Patent No.: US 10,301,851 B1
(45) Date of Patent: May 28, 2019

(54) SYSTEMS AND METHODS FOR SECURING GOODS USING A SEAT BELT RECEPTACLE OF A VEHICLE

(71) Applicant: Bradley W. Cummings, Long Beach, CA (US)

(72) Inventor: Bradley W. Cummings, Long Beach, CA (US)

( * ) Notice: Subject to any disclaimer, the term of this patent is extended or adjusted under 35 U.S.C. 154(b) by 0 days.

(21) Appl. No.: 16/143,272

(22) Filed: Sep. 26, 2018

Related U.S. Application Data

(63) Continuation-in-part of application No. 15/884,960, filed on Jan. 31, 2018.

(51) Int. Cl.
| | | |
|---|---|---|
| *E05B 73/00* | (2006.01) | |
| *B60R 7/04* | (2006.01) | |
| *B60R 7/08* | (2006.01) | |
| *B60R 11/00* | (2006.01) | |
| *E05B 65/00* | (2006.01) | |
| *E05G 1/00* | (2006.01) | |
| *E05B 79/04* | (2014.01) | |

(52) U.S. Cl.
CPC .......... *E05B 73/0005* (2013.01); *B60R 7/04* (2013.01); *B60R 7/087* (2013.01); *B60R 11/00* (2013.01); *E05B 65/0075* (2013.01); *B60R 2011/0031* (2013.01); *B60R 2011/0061* (2013.01); *B60R 2011/0096* (2013.01); *E05B 79/04* (2013.01); *E05G 1/005* (2013.01)

(58) Field of Classification Search
CPC ........ E05B 79/04; E05B 77/44; B60R 7/043; B60R 7/087; B60R 2022/1806
USPC .......... 70/14, 18, 57, 58, 30, 49, 63; 109/45, 109/50, 52
See application file for complete search history.

(56) References Cited

U.S. PATENT DOCUMENTS

| | | | | |
|---|---|---|---|---|
| 4,497,094 A | * | 2/1985 | Morris | A44B 11/2576 220/284 |
| 4,674,303 A | * | 6/1987 | Salcone, II | A44B 11/2576 206/807 |
| 4,878,277 A | * | 11/1989 | Portuese | A44B 11/2576 24/633 |
| 5,129,129 A | * | 7/1992 | Collins | A44B 11/2576 24/579.11 |
| 5,442,840 A | * | 8/1995 | Ewald | A44B 11/2576 24/579.11 |
| 5,749,130 A | | 5/1998 | Bilyeu et al. | |
| D396,736 S | * | 8/1998 | Davis | D2/639 |
| 6,041,480 A | * | 3/2000 | White | A44B 11/2576 24/487 |
| 6,769,157 B1 | * | 8/2004 | Meal | A44B 11/2576 220/284 |
| 7,305,858 B1 | * | 12/2007 | Wu | B60R 7/087 109/47 |
| 2002/0148395 A1 | * | 10/2002 | Judge | A45C 13/20 109/52 |
| 2004/0045329 A1 | * | 3/2004 | Farnham | E05B 73/0005 70/63 |
| 2008/0072633 A1 | * | 3/2008 | Samuel | E05B 67/003 70/58 |
| 2010/0308637 A1 | * | 12/2010 | Strutz | B60R 21/18 297/468 |

(Continued)

*Primary Examiner* — Suzanne L Barrett
(74) *Attorney, Agent, or Firm* — Umberg Zipser LLP

(57) ABSTRACT

A locking device that locks to a seatbelt buckle, and covers the buckle release mechanism so that the tongue cannot be released from the buckle until the locking device is unlocked and removed.

8 Claims, 3 Drawing Sheets

(56) References Cited

U.S. PATENT DOCUMENTS

| | | | | |
|---|---|---|---|---|
| 2012/0298018 A1* | 11/2012 | McCabe | ............ | A45C 13/20 |
| | | | | 109/51 |
| 2015/0076806 A1* | 3/2015 | Sucato | ............ | B60R 22/18 |
| | | | | 280/801.1 |
| 2015/0107312 A1* | 4/2015 | Kachler | ............ | E05B 73/0005 |
| | | | | 70/18 |
| 2015/0289602 A1* | 10/2015 | Crossland | ............ | A44B 11/2576 |
| | | | | 70/14 |
| 2015/0305538 A1* | 10/2015 | Sundaresan | ............ | A47G 29/124 |
| | | | | 232/36 |
| 2017/0234056 A1* | 8/2017 | Peck | ............ | E05G 1/005 |
| | | | | 109/52 |

\* cited by examiner

SYSTEMS AND METHODS FOR SECURING GOODS USING A SEAT BELT RECEPTACLE OF A VEHICLE

This application is a continuation-in-part application of U.S. patent application having Ser. No. 15/884,960 filed on Jan. 31, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is locking devices.

BACKGROUND

The following description includes information that may be useful in understanding the present invention. It is not an admission that any of the information provided herein is prior art or relevant to the presently claimed invention, or that any publication specifically or implicitly referenced is prior art.

Smash and grab robberies often involve a person waiting for a person to leave their automobile, then breaking in to quickly take valuables and leaving. These are often crimes of opportunity, with the robbery perpetrator wanting to get things as quickly as they can.

For example, there have been situations where organized teams of individuals watch people in certain kinds of parking lots such as beach parking lots. When victims leave their car, or get on their surfboards, another individual is informed, who breaks into the car and steals the valuables.

There are various kinds of safes that can be installed in vehicles, such as gun safes and other kinds of permanently installed safes. These, however, require complete retrofit of the vehicle to install the safe in a secure way, such that it cannot be easily removed. This retrofit is expensive and takes up permanent room in the vehicle, and often requires professional installation.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for locking devices for temporarily securing goods that can be used within existing vehicles.

SUMMARY OF THE INVENTION

The inventive subject matter provides apparatus, systems and methods for a device that can be quickly and easily secured within cars, busses, or other vehicles having seat belts to temporarily secure items within the vehicle without requiring the vehicle to be retrofitted. Preferred devices comprise a housing having a first opening disposed opposite of a first surface, with the housing, first surface, and first opening defining a hollow portion of the device. A tab extends from the first surface toward the first opening. The preferably comprises a first set of surfaces that are collectively configured to permit the tab to be attached to a seatbelt buckle disposed in a vehicle.

As with most seatbelt buckles in vehicles, the buckle preferably has a seatbelt release button that when depressed or otherwise actuated, releases the tab from the buckle.

A cable can be connected to a first end of the housing, where an opposite end of the cable can be attached to special secure safe device, which could include a travel or other bag, wire mesh netting, a strong box, or other secured container within which valuables can be placed. In this manner, when the device's tab is inserted into the buckle, the secured container attached to the device is secured to the vehicle until the buckle's release button is actuated. Because the device's housing covers and prevents access to the release button of the buckle, the release button cannot be depressed, and hence the device/secured goods are locked in to the vehicle via the seatbelt buckle. Because the seatbelt buckle is configured to withstand the forces from a high-speed collision and the weight of a vehicle occupant, they are very well secured to the vehicle to prevent disengagement from the vehicle in such circumstances and thus cannot be easily removed from the vehicle. Often, the seatbelt buckles are bolted to the frame of the vehicle by webbing that is designed to withstand significant forces and therefore cannot easily be circumvented.

In many vehicles, the secured container may be placed in a trunk or underneath the seat of the vehicle so that the valuables are not in plain sight, while still permitting the device to be secured to a seat belt buckle of the vehicle.

The device's housing is preferably sized and dimensioned to cover the tab and at least a portion of the seatbelt buckle of the vehicle when the tab is attached to the buckle. The portion of the buckle covered by the housing includes the seatbelt release button on the buckle, such that the device's housing prevents or inhibits actuation of the seatbelt release button.

To permit actuation of the buckle when desired, the device comprises a release mechanism that may permit or cause depression of the seatbelt release button when the release mechanism is itself actuated. For example, in some embodiments, the release mechanism can comprise a key lock, a combination lock, or other suitable lock, which can be actuated by the user with the key or combination. When the release mechanism is actuated, it is contemplated that a portion of the housing can slide relative to the device such that the release button of the buckle is accessible. In an alternative embodiment, it is contemplated that when the release mechanism is actuated, this causes a projection to contact the buckle's release button, thereby actuating the release button and disengaging the tab from the buckle. Thus, the user who the key or combination to the device can easily unlock and remove the device, and thus remove the secured container/package from the vehicle.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Embodiments describe a device which secures itself into an existing seatbelt buckle of a vehicle, for example, with the device's housing covering the seat belt release mechanism such that the release mechanism of the buckle cannot be depressed until a release mechanism of the device is actuated. The device can be connected to a theft proof holder, such as a strong box or theft proof backpack, via a secured cable, for example.

Figure 1:
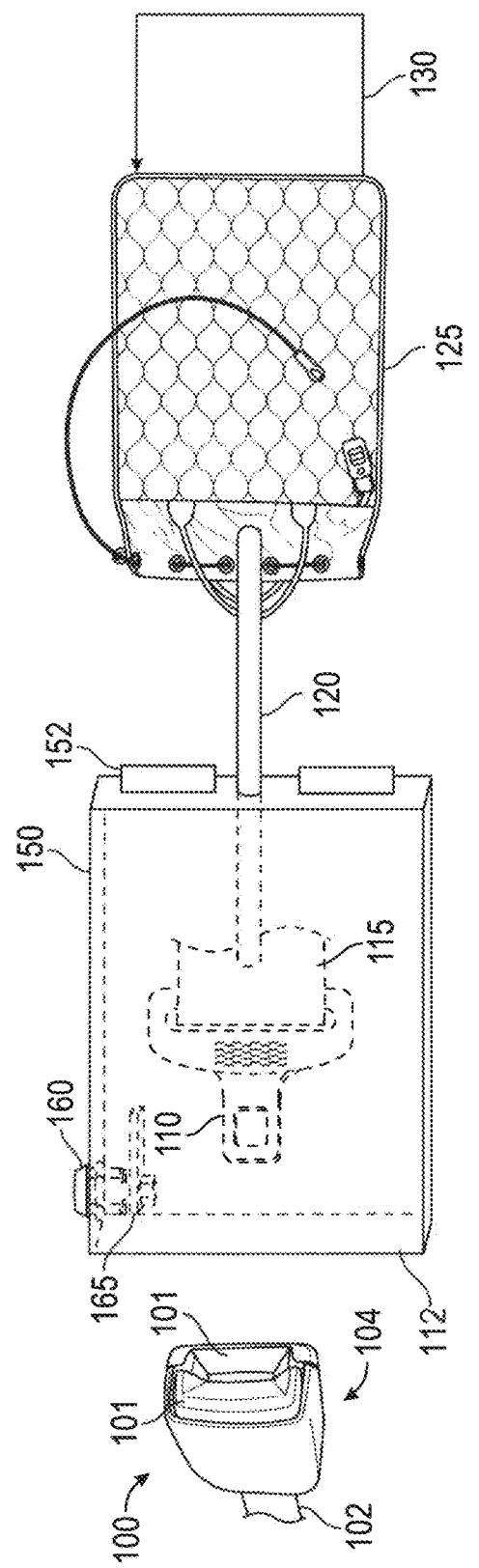
FIG. 1 illustrates a first embodiment of the locking device.

FIG. 1 illustrates one embodiment of a device 150 for securing valuables within a vehicle using a mesh bag or other container 125. Device 150 can comprise an ABS plastic or aluminum housing, for example, that attaches to a steel cable 120. Cable 120 can attach to or couple with the container 125 at the other end, as shown in FIG. 1. Of course, other commercially suitable materials or combinations thereof could be used for device and cable so long as they are unable to quickly be cut or broken by scissors or a pocket knife, for example. The device 150 is configured to be secured to an existing seatbelt buckle 100 of a vehicle, thereby preventing or inhibiting container 125 from being removed from the vehicle.

The buckle 100 is as per typical anchor to an anchor point 102 within the vehicle, and often anchors to the vehicle's frame. The buckle 100 comprises a receptacle 104 and a release button 101, which when actuated permits the release of the seatbelt tab that is inserted within the receptacle 104.

The housing of device 150 comprises a first opening 112, which can be disposed on an opposite side where the cable 120 attaches to the device 150. The opening 112 is sized and dimensioned receive the seatbelt buckle 100, such that at least a portion of the buckle 100 can be inserted into the opening 112.

A tab 110 is preferably disposed within a hollow portion 114 of the housing, and is accessible via the opening 112. The tab 110 preferably has a first set of surfaces which are configured to allow the tab 110 to attach to the existing seatbelt buckle 100 disposed in the vehicle.

In some embodiments, the seatbelt tab 110 can attach securely at an attachment point 115 to the cable 120, which may comprise a polyurethane coated, braided steel cable. The other end of the cable 120 has a connection to the container 125 and/or a strongbox shown as 130. As described herein, the antitheft backpack or other container 125 is not part of the invention, and can be any commercially suitable antitheft device, e.g. a strongbox or the like.

As mentioned above, the device 150 and its housing can be formed of a rigid material such as ABS plastic or aluminum. Device preferably includes a release mechanism 160. The release mechanism may attach, for example, to a surface such as 104 of the seatbelt buckle, to hold the cover 150 over the buckle.

It is contemplated that the release mechanism 160 can include a movable piece 165 that when secured prevents the device 150 from being removed from the seatbelt buckle 100. When the release mechanism is actuated or unlocked, tab 110 can be released from the buckle 100, thereby permitting release of the container 125. The release mechanism can comprise a key or combination lock, for example, but could also include other commercially suitable locks including a digital release via a smartphone or fingerprint, for example.

When secured into place, the device 150 covers the release button 101 of the buckle 100, preventing actuation of the release button. Since the device 150 is locked into place, the device 150 and container 125 cannot be removed until the release mechanism 160 is actuated.

Figure 2:
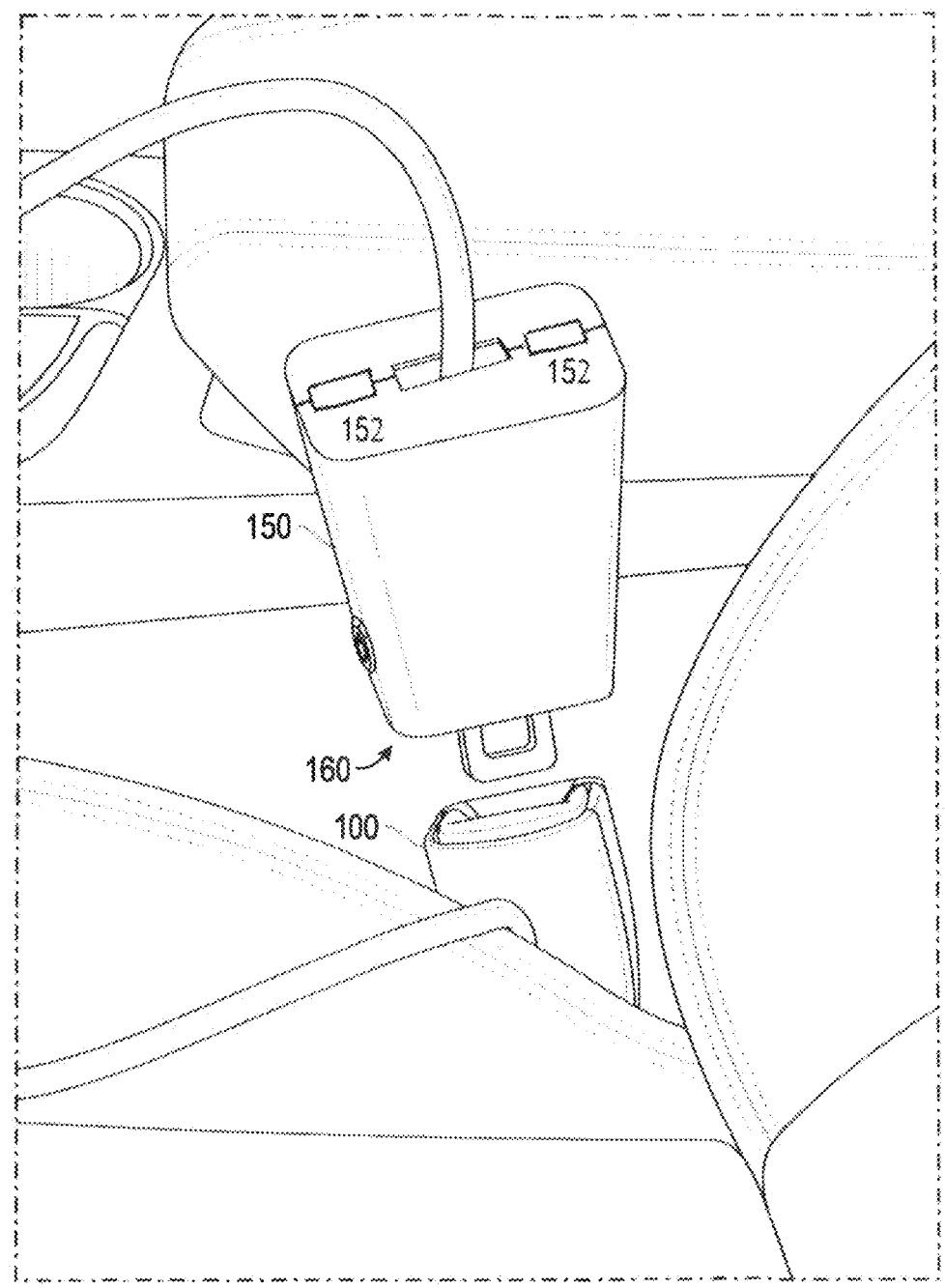
FIG. 2 illustrates the locking device of FIG. 1 being connected into the theft proof device.

FIG. 2 shows the device 150 where the housing has moved relative to the device, such that the tab 110 is outside of the housing. In such position, the release button of the seatbelt buckle can be depressed or actuated to release the tab 110 from the buckle 100.

According to an alternative embodiment, the tab 110 is permanently attached to the device 150. In this embodiment, the device 150 may comprise a foldable or otherwise moveable cover or housing which changes its position to expose the seatbelt release button 101. In another embodiment, the tab 110 can be permanently attached to the box style structure shown in the FIG. 1 embodiment.

In still another embodiment, the device 150 can comprise a locking clamshell which folds along a center hinge line which can be, for example, a piano style hinge 152. When closed, the release mechanism holds the clamshell closed, and retains the clamshell about the seat belt buckle 100.

In still another embodiment, a universal seatbelt tab 110 is used can be used for a number of different seat belt buckles. The steel cable 120 can alternatively be a nylon seatbelt cable, preferably one with anti-cut properties.

Figure 3A:
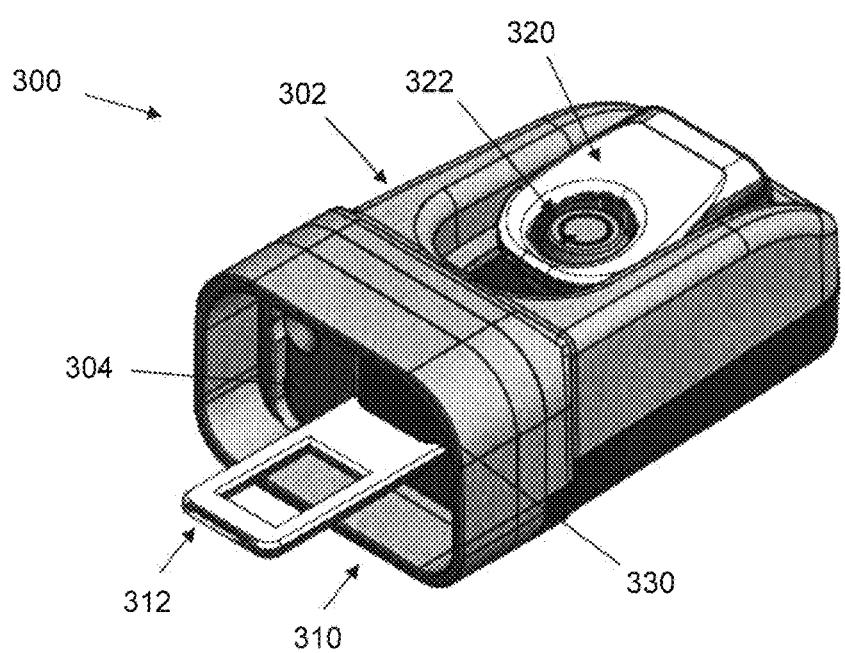
FIGS. 3A-3B illustrate a second embodiment of the locking device.
Figure 3B:
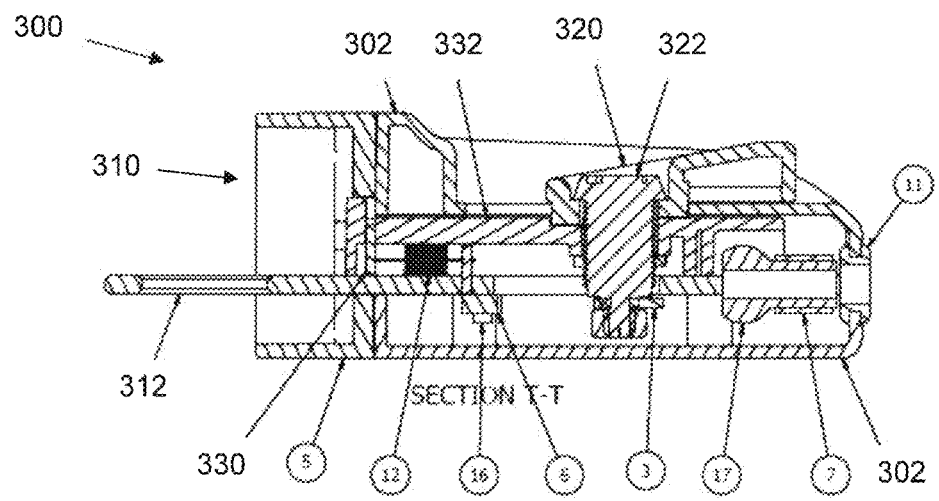

FIG. 3A-3B illustrate another embodiment of a device 300 for securing goods within a vehicle. As discussed above, device 300 can be coupled with or attached to a cable via pieces 7, 11 and 17, and the cable itself can be attached or coupled with a secured bag or other container. Device 300 comprises a housing 302 that is preferably composed of ABS plastic, aluminum, or other commercially suitable material(s) or combination(s) thereof, such the device cannot be easily damaged.

A first end of the housing 302 comprises an opening 310 opposite a first surface 304 of the housing 302. The housing 302, first surface 304, and opening 310 define a hollow portion of the device 300. A tab 312 extends from the first surface 304 toward the opening 310. Although shown that the tab 312 extends out from the opening 310, in other contemplated embodiments, the tab can be disposed entirely within the hollow portion of the housing 302, and would not extend through the opening 310.

Tab 312 comprises a set of surfaces which are configured to permit tab 312 to be inserted into and connect with a seatbelt buckle disposed in a vehicle, such as described above. As with most seatbelt buckles for vehicles, the buckle includes a seatbelt release button that when depressed disengages tab 312 from the buckle.

Housing 302 is sized and dimensioned to cover at least a portion of the tab 312 and buckle of the vehicle when the tab 312 is attached to the buckle. In this manner, when the tab 312 is inserted within the buckle, the release button of the buckle is inserted through opening 310 and into the hollow portion, and is thereby covered by the housing 302. Thus the housing 302 prevents or inhibits depression of the seatbelt release button, preventing disengagement of the tab 312 from the buckle.

Device 300 further comprises a release mechanism 320, which permits or causes depression of the release button of the seatbelt button when actuated. In one embodiment, the release mechanism 320 comprises a lock 322 that is actuated via a key. Of course, combination or other commercially suitable locks could be used without departing from the scope of the invention.

In one embodiment, actuation of the lock 322 causes movement of a projection 330 via a connecting piece 332, such that the projection 330 moves within the hollow portion toward the opening 310. Advantageously, the projection 330 can depress the release button of the buckle once the projection 330 is moved from its initial position shown in FIGS. 3A-3B to a second position.

In another embodiment such as that described above, actuation of the lock 322 can cause a portion of the housing 302 to move, such that the release button is no longer covered.

In still further embodiments, the device can be directly secured to a backpack or other container for quick connection to a vehicle's seatbelt buckle. In still other embodiments, the backpack or other container could comprise the device on one portion and a buckle on another portion, such that when the device and buckle are coupled, the bag or other container is secured about an object. This can be useful during traveling, for example, where a user may wish to secure a bag to a pole, a rack, or other surface to prevent the container from being stolen by thieves.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A securing device comprising:
    a housing having a first opening disposed opposite of a first surface, wherein the housing, first surface, and first opening define a hollow portion of the device;
    a tab extending from the first surface toward the first opening, wherein the tab has a first set of surfaces which is configured to attach to a seatbelt buckle disposed in a vehicle that has a seatbelt release button;
    a cable connected to a first end of the housing;
    wherein the housing is sized and dimensioned to cover the tab and at least a portion of the seatbelt buckle of the vehicle when the tab is attached to the buckle, where the portion of the buckle covered by the housing comprises the seatbelt release button on the seatbelt buckle, such that the housing prevents or inhibits depression of the seatbelt release button; and
    a release mechanism having a projection that moves within the hollow portion away from the first surface when actuated, and wherein movement of the projection via actuation of the release mechanism depresses the seatbelt release button.

2. The device as in claim 1, wherein a second end of the secure connecting cable includes a connection portion which connects to a device to be secured.

3. The device as in claim 1, wherein the housing is formed of a hard material.

4. The device as in claim 1, wherein the projection of the release mechanism is at least partially disposed within the housing.

5. The device as in claim 1, wherein the seatbelt tab is affixed to the first surface of the housing.

6. The device as in claim 1, wherein the cable is a polyurethane coded steel cable.

7. The device of claim 1, wherein the portion of the buckle is received within the opening.

8. The device of claim 1, wherein the cable is coupled with a wire mesh bag.

* * * * *